Patented July 24, 1951

2,561,973

UNITED STATES PATENT OFFICE 2,561,973

FORMALDEHYDE-UREA CONDENSATION

Oscar P. Cohen, Watertown, Mass., assignor to Monsanto Chemical Company, St. Louis, Mo., a corporation of Delaware No Drawing. Application April 30, 1949, Serial No. 90,767

7 Claims. (Cl. 260—553)

The present invention relates to processes of preparing improved urea-formaldehyde condensation products and to the products so prepared.

Various processes have been suggested, heretofore, for the preparation of urea-formaldehyde condensation products. Products produced in accordance with such processes while suitable for some purposes, for example, as moulding or casting resins, are not entirely suitable for the impregnation of textile materials especially when it is desired to treat textile materials to render them shrink and/or crease-resistant and yet substantially unaltered in hand or feel. Experiments have indicated that one of the necessary or essential characteristics of a good urea-formaldehyde textile impregnating condensation product is its freedom from polymers, that is, trimers, tetramers and other high molecular weight products. In other words, a textile impregnating resin gives best results when it is employed as a monomeric condensation product. Many of the urea-formaldehyde condensation products prepared by prior art processes are not essentially monomeric, however, and thus are not suitable for textile impregnation. Such condensation products, while they may be monomeric as prepared, polymerize in storage and/or during their use in textile impregnating solutions and thus are not essentially monomeric when applied to the textile fabric and usually impart a harsh hand or feel to the fabric and/or even render the fabric brittle.

Thus one of the problems which has faced resin manufacturers for many years is the preparation, on a commercial scale, of a urea-formaldehyde condensation product which is essentially monomeric and which has good stability on storage without appreciable polymerization and yet has good stability in a textile impregnating bath in the presence of a latent curing catalyst. Moreover, a product which meets these exacting standards must also cure rapidly and be highly resistant to laundering when cured. This invention provides processes for producing a urea-formaldehyde condensation product which has these characteristics and other desirable properties in addition.

It is one object of this invention to provide processes for the preparation of an essentially monomeric urea-formaldehyde condensation product which has improved stability in storage and in aqueous solutions.

A further object of this invention is to provide processes for the preparation of an essentially monomeric urea-formaldehyde condensation product which has excellent low and high temperature stability and cures rapidly in the presence of heat and a latent curing catalyst.

A further object of this invention is to provide an improved urea-formaldehyde condensation product for use in the preparation of shrink and/or crease-resistant textile materials.

Still further objects of the invention will be apparent from the following description and the appended claims.

The processes of this invention are carried out, in general, by first adding 1 molecular proportion of urea to an aqueous formaldehyde solution containing from 1.4 to 2.0 molecular proportions of formaldehyde at room temperature. The resulting solution is adjusted to a pH between 7.8 and 8.3 by the addition thereto of an aliphatic amine such as triethanol amine or alicyclic amine such as cyclohexyl amine having from 2 to 6 carbon atoms, and a sodium compound selected from the group consisting of sodium carbonate, sodium hydroxide and sodium borate. The amine and sodium compound may be added in any order, but it is essential that they be employed in a weight ratio between 2:1 and 50:1. The temperature of the reaction mixture is maintained below 90° F. for at least 1 hour and is maintained thereafter not higher than 150° F., preferably below 100° F. The reaction is completed when the reaction mass contains less than 2.5% free formaldehyde by weight.

The formaldehyde solution used in accordance with the above process preferably contains from 6 to 12% by weight of methanol. However, solutions containing less methanol or free of methanol may also be used.

By following these processes it is possible to prepare an essentially monomeric urea-formaldehyde condensation product which is stable in storage for from 4 to 6 months at temperatures of 40° F., or less, to 50° F. and for at least 3 days at temperatures of 115° F., without appreciable polymerization. Moreover, the condensation product cures rapidly at elevated temperatures, for example, 275° F. or higher in the presence of a latent curing catalyst such as diammonium hydrogen phosphate.

As examples of aliphatic amines which are useful in carrying out the above described processes may be mentioned alkylol amines having from 2 to 6 carbon atoms such as monoethanol amine, diethanolamine, triethanol amine, 2-amino-2-methyl propanol, 2-amino butanol and the like, and alkyl amines having from 2 to 6 carbon atoms such as triethyl amine, propyl amine, butyl amine and the like. Alicyclic amines such as cyclobutyl amine, cyclohexyl amine and the like may be employed in lieu of the aliphatic amines or in mixtures therewith. Of the above amines, triethanol amine is preferred.

It has presently been found that the use of an amine and a sodium compound, as hereinbefore described, is necessary for the preparation of a urea-formaldehyde condensation product which has good high and low temperature stability. The aliphatic amines of the type described impart high temperature stability to the condensation product. The use of sodium hydroxide, sodium carbonate or sodium borate or mixtures thereof enables the preparation of urea-formaldehyde condensation products which are stable at low temperatures. The weight ratio of amine to sodium compound, used to adjust the pH of the urea-formaldehyde solution between 7.8 and 8.3, may be varied between 2:1 and 50:1 as hereinbefore described. However, it is preferred to use the amine and sodium compound in a weight ratio between 25:1 and 50:1.

The reaction between urea and formaldehyde in the presence of aliphatic amines and sodium compounds, hereinbefore described, at a pH between 7.8 and 8.3 is exothermic and the temperature of the reaction mass must be maintained below 150° F., in most instances, by cooling. In general, when the urea is first added to an aqueous solution of formaldehyde at about 60° F., the temperature of the mixture drops to about 32° F. indicating a negative heat of solution. After the pH of the solution of urea and formaldehyde is adjusted between 7.8 and 8.3, the reaction mixture is preferably heated to 70° to 90° F. and maintained at this temperature, by cooling if necessary, for about 1 hour. It is preferred to maintain the temperature below 100° F. by cooling, if necessary, until the reaction is complete, which generally requires up to 24 hours, or at least until the solution contains less than 1.5% of free formaldehyde by weight. This procedure gives the best results. In those instances where it is desired to shorten the reaction cycle, this may be done by heating the solution after the first hour from 90° to 140° F. and then maintaining the temperature at 140° F. for 40 minutes and then cooling rapidly to room temperature. Alternatively, the solution may be heated after the first hour at 150° F. for 10 minutes and then cooled to room temperature as rapidly as possible.

After the reaction between the urea and formaldehyde is substantially complete, the reaction mixture is preferably cooled to room temperature, for example, 65° to 75° F. The resulting product is obtained in the form of a slurry or thin cream which thickens on standing to a paste. The slurry or thin cream is preferably pumped to a homogenizer and then stored in suitable containers where it thickens to form a paste. If desired, the initial slurry or thin cream may be filtered, centrifuged or the like to remove the liquid constituents and then dried under vacuum to a granular solid.

A preferred procedure for the preparation of a urea-formaldehyde condensation product is illustrated in the following example, parts and percentages being by weight unless otherwise specified.

*Example*

Thirty-two and six-tenths parts of commercial grade urea were added rapidly to 62.5 parts of commercial grade formalin containing 37.5% of formaldehyde and 6% methanol at a temperature of 70° F., with slow stirring. The rate of agitation was then increased and 0.0066 part of sodium carbonate was added to the mixture of urea and formaldehyde. The temperature of the mixture dropped to about 32° F. while the urea dissolved in the formaldehyde solution. The mixture was heated slowly until it reached a temperature of 50° F., after which 0.22 part of triethanol amine was added. The reaction mixture was a clear liquid and its temperature was raised slowly by heating until it reached 85° F. The reaction mixture was maintained at this temperature for 24 hours with stirring. The pH remained between 7.85 and 8.1 throughout this reaction period. The mixture was cooled rapidly, after 24 hours, to a temperature of 68° F. and held at this temperature for 1½ hours. The condensation product started to crystallize after about 12 hours of the 24-hour reaction cycle at 86° F. and the crystallization of the product was practically complete after the 1½ hour cooling period.

The reaction mixture was obtained as a slurry or thin cream which was pumped through a colloid mill type homogenizer set at 0.001 inch clearance and then collected in containers. After standing this product changed to a thick homogeneous paste and was essentially monomeric. It was stable at 113° F. for 3 days or more and at 41° to 50° F. for 6 months, without appreciable polymerization. The product contained less than 1.5% free formaldehyde. It cured within 2 seconds in the presence of a latent curing catalyst, after the evaporation of water, when dropped on a hot plate maintained at 150° C. The paste product was white and had a color in a water solution of less than 30 on the platinum-cobalt (Hazen) color standards.

The term "essentially monomeric" as used in the foregoing example and the description of the invention is intended to mean a monomer or a mixture consisting essentially of a monomer and only small amounts of dimers, trimers, tetramers or other high molecular weight products.

The urea-formaldehyde condensation products prepared in accordance with the processes described herein have an exceptionally good bath life either in the presence or absence of latent curing catalysts. For example, aqueous solutions containing 25% by weight of such condensation products (in the form of a 55% solids paste) are stable, without percipitation or flocculation of resin, at 25° C. for from 25 to 40 days in the absence of a latent curing catalyst. In this respect such condensation products are at least 50% and often as high as 500% more stable in aqueous solutions than the best commercially available urea-formaldehyde condensation products at the same solids concentration.

The condensation products of this invention are also decidedly superior in stability to commercially available urea-formaldehyde condensation products, in an aqueous solution in the presence of the same latent curing catalyst. Thus, an aqueous solution containing 25% by weight of the urea-formaldehyde condensation products of this invention (in the form of a 55% solids paste) and 2% by weight of a latent curing catalyst such as 2-amino-2-methyl propanol phosphate is stable, without flocculation or precipitation, at least 50% longer at 25° C. than an aqueous solution containing 25% by weight of the best, commercially available urea-formaldehyde condensation product, on the same solids basis, and the same quantity of the same latent curing catalyst.

The urea-formaldehyde condensation products of the present invention are especially useful for the impregnation of textile materials such as wool, rayon, cotton and the like. When they are applied to such textile materials in the form of a water solution together with a latent curing catalyst of the type well known in this art, and the textile material is dried and heated at elevated temperatures, it is possible to produce shrink and/or crease-resistant materials having an exceptionally soft hand or feel. In general, the application of 8 to 12% by weight of condensation product on a cotton or rayon fabric is sufficient to impart excellent shrink and crease-resistance, after drying and curing of the condensation product.

Various modifications and changes may be made in the processes described herein as will be apparent to those skilled in the art and it is intended that this invention be limited only by the scope of the appended claims.

What is claimed is:

1. A process of preparing essentially monomeric urea-formaldehyde condensation products which are stable in storage which comprises adding 1 molecular proportion of urea to a water solution of 1.4 to 2.0 molecular proportions of formaldehyde; adjusting the pH of the resulting solution between 7.8 and 8.3 by the addition thereto of (1) an amine selected from the group consisting of alkylol amines, alkyl amines and cyclohexyl amine and having from 2 to 6 carbon atoms and (2) a sodium compound selected from the group consisting of sodium hydroxide, sodium carbonate and sodium borate; said amine and sodium compound being employed in a weight ratio between 25:1 and 50:1; maintaining the temperature of the resulting mixture below 90° F. for at least 1 hour and then maintaining the temperature of the mixture below 150° F. until the free-formaldehyde content of said mixture is below 2.5% by weight.

2. A process substantially according to claim 1, wherein said amine is triethanol amine.

3. A process substantially according to claim 1, wherein said amine is diethanol amine.

4. A process substantially according to claim 1, wherein said amine is 2-amino butanol.

5. A process of preparing essentially monomeric urea-formaldehyde condensation products which are stable in storage which comprises adding 1 molecular proportion of urea to a 37.5% water solution of formaldehyde containing 6 to 12% by weight of methanol, said solution being supplied in an amount sufficient to provide from 1.4 to 2.0 molecular proportions of formaldehyde for each molecular proportion of urea; adjusting the pH of the resulting solution between 7.8 and 8.3 by the addition thereto of (1) an amine selected from the group consisting of alkylol amines, alkyl amines and cyclohexyl amine and having from 2 to 6 carbon atoms and (2) a sodium compound selected from the group consisting of sodium hydroxide, sodium carbonate and sodium borate, said amine and sodium compound being employed in a weight ratio between 25:1 and 5:1; maintaining the temperature of the resulting mixture below 90° F. for at least 1 hour and then maintaining the temperature of the mixture below 150° F. until the free formaldehyde content of said mixture is below 1.5% by weight.

6. A process substantially according to claim 5, wherein said amine is triethanol amine and said sodium comound is sodium carbonate.

7. A urea-formaldehyde condensation product prepared according to the process of claim 1.

OSCAR P. COHEN.

REFERENCES CITED

The following references are of record in the file of this patent:

UNITED STATES PATENTS

| Number | Name | Date |
| --- | --- | --- |
| 1,963,762 | Pungs et al. | June 19, 1934 |
| 1,989,628 | Schmihing | Jan. 29, 1935 |
| 2,098,942 | Brubaker | Nov. 16, 1937 |
| 2,226,518 | Hodgins et al. | Dec. 24, 1940 |
| 2,312,703 | D'Alelio | Mar. 2, 1943 |
| 2,315,745 | Sorenson | Apr. 6, 1943 |
| 2,321,544 | Dittmar et al. | June 8, 1943 |
| 2,339,621 | D'Alelio | Jan. 18, 1944 |
| 2,352,552 | Hienzle | June 27, 1944 |
| 2,389,415 | D'Alelio | Nov. 20, 1945 |
| 2,467,212 | Kvalnes | Apr. 12, 1949 |

FOREIGN PATENTS

| Number | Country | Date |
| --- | --- | --- |
| 484,209 | Great Britain | May 2, 1938 |